US009657927B1

(12) United States Patent
Lanham

(10) Patent No.: US 9,657,927 B1
(45) Date of Patent: May 23, 2017

(54) LIGHTING ARRANGEMENT WITH A CONTROL BOX INCLUDING CONTROLLER AND POWER SUPPLIES

(71) Applicant: NINE 24, INC., Louisville, KY (US)

(72) Inventor: Charles Edward Lanham, Louisville, KY (US)

(73) Assignee: Nine 24, Inc., Louisville, KY (US)

( * ) Notice: Subject to any disclaimer, the term of this patent is extended or adjusted under 35 U.S.C. 154(b) by 62 days.

(21) Appl. No.: 14/851,385

(22) Filed: Sep. 11, 2015

Related U.S. Application Data

(60) Provisional application No. 62/052,540, filed on Sep. 19, 2014.

(51) Int. Cl.
*F21V 23/02* (2006.01)
*F21V 23/06* (2006.01)
*F21V 23/00* (2015.01)
*F21S 8/04* (2006.01)

(52) U.S. Cl.
CPC .......... *F21V 23/008* (2013.01); *F21S 8/046* (2013.01); *F21V 23/001* (2013.01); *F21V 23/023* (2013.01); *F21V 23/06* (2013.01)

(58) Field of Classification Search
CPC .... F21V 23/008; F21V 23/001; F21V 23/023; F21V 23/06; F21S 8/046
See application file for complete search history.

(56) References Cited

U.S. PATENT DOCUMENTS

| 5,789,828 A * | 8/1998 | Tremaine | H02J 9/02 307/150 |
|---|---|---|---|
| 8,096,671 B1 * | 1/2012 | Cronk | F21S 2/005 362/147 |
| 8,197,079 B2 | 6/2012 | Ruud | |
| 8,445,826 B2 * | 5/2013 | Verfuerth | H05B 37/0218 250/205 |
| 8,616,720 B2 | 12/2013 | Carney | |
| 8,710,772 B2 | 4/2014 | Henig | |
| 8,742,680 B2 | 6/2014 | Cowburn | |
| 2007/0123075 A1 * | 5/2007 | Insalaco | H01R 13/6633 439/120 |
| 2012/0071082 A1 * | 3/2012 | Karamanos | F24F 5/0003 454/284 |

* cited by examiner

*Primary Examiner* — Alan Cariaso
(74) *Attorney, Agent, or Firm* — Theresa Camoriano; Guillermo Camoriano; Duncan Galloway Egan Greenwald PLLC

(57) ABSTRACT

A lighting arrangement includes a control box which defines a line voltage wiring channel and a low voltage area and has at least one low voltage power supply mounted in the line voltage wiring channel and a controller mounted in the low voltage area and communicating with the low voltage power supply.

11 Claims, 4 Drawing Sheets

LIGHTING ARRANGEMENT WITH A CONTROL BOX INCLUDING CONTROLLER AND POWER SUPPLIES

This application claims priority from U.S. Provisional Application Ser. No. 62/052,540 filed Sep. 19, 2014.

BACKGROUND

In a typical prior art lighting arrangement for a classroom or a commercial building, there are several separate light fixtures, each with its own fluorescent ballast or LED power supply. The installation of these lighting arrangements is expensive in terms of labor and materials, as it requires running conduit with line voltage (110V or greater) to each light fixture.

In the prior art, the lighting components are located on hard-wired junction boxes in multiple locations above the dropped ceilings. Running conduit, mounting electrical boxes, installing flexible conduits, and making wiring connections are the major part of installing the lighting system. Ductwork for heating and air conditioning, and plumbing pipes and sprinkler systems are then mounted above the dropped ceilings. The dropped ceilings, ductwork, and pipes then obscure and make it difficult to find the devices and get access to them to maintain or replace components, making maintenance and repair difficult and time consuming. Installation and field wiring also are time consuming and expensive.

SUMMARY

The present invention provides a lighting arrangement that is much less expensive to install and to maintain, because the low voltage power supplies for several light fixtures are located in a single electrical box, and low voltage cables are run from the low voltage power supplies to the various light fixtures. A controller is located in a low voltage area of the box, which is separate and isolated from the line voltage area in which the power supplies are located, and the controller controls the power supplies. The controller may communicate with various sensors and controllers through low voltage cables. The electrical box may be designed to fit within the confines of a 2'×2' suspension grid typical of dropped ceiling tiles (such as acoustic ceiling tiles). The electrical box may be sized to replace one of the 2'×2' ceiling tiles and may include a hinged and cam-latched door to access the interior of the electrical box. When the hinged door is swung open, it reveals the interior of the electrical box, which is physically segregated into a line voltage wiring conduit (110V or greater) and a low voltage area (58 V or less), with access to the factory wired line voltage conduit being isolated by a channel cover to make it safe for a non-electrician (such as a maintenance man or handyman) to handle low voltage interconnections as well as common troubleshooting and maintenance tasks.

A photo sensor may be mounted on the outside of the hinged door and may communicate with the controller in the low voltage area in order to maintain the desired environmental light level regardless of the external light conditions (such as sunny, overcast, or nighttime). In addition to or instead of the photo sensor, a motion sensor may allow the controller to automatically turn off any lights as long as no motion has been detected in the room, and turn them back on when motion is detected. By mounting the photo- and/or motion-detect sensor, controller and power supplies all in the same box, with the low voltage control area segregated from the line voltage wiring channel, and by using modular, plug-in type connections, the installation and troubleshooting are much easier than in prior art installations. For example, an installation that normally would take two months can be performed in two days, and most of the installation can be performed by people who are not licensed electricians.

DESCRIPTION

Figure 1:
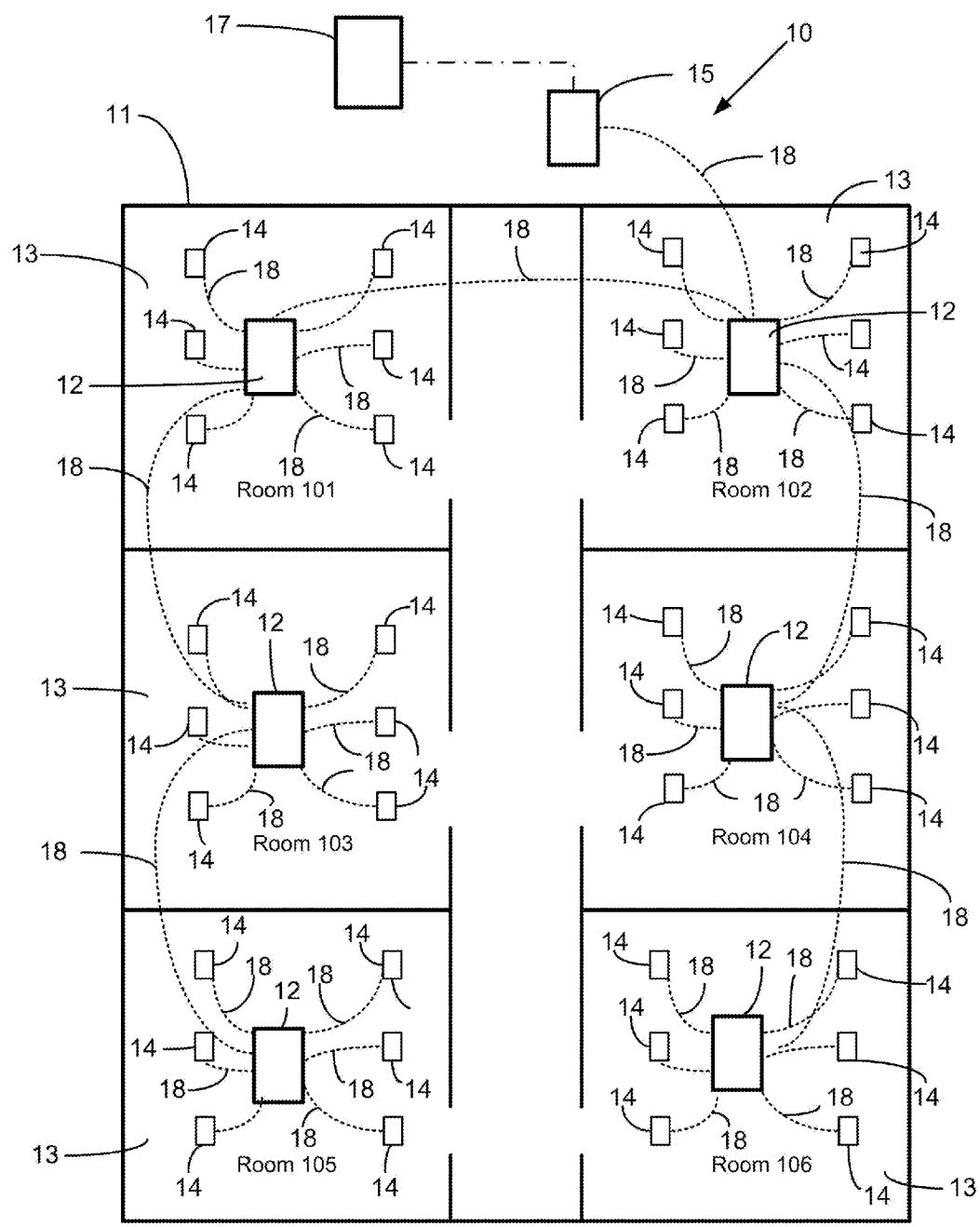
FIG. 1 is a schematic of a lighting system with six control boxes and a plurality of low voltage light fixtures made in accordance with the present invention.
Figure 2:
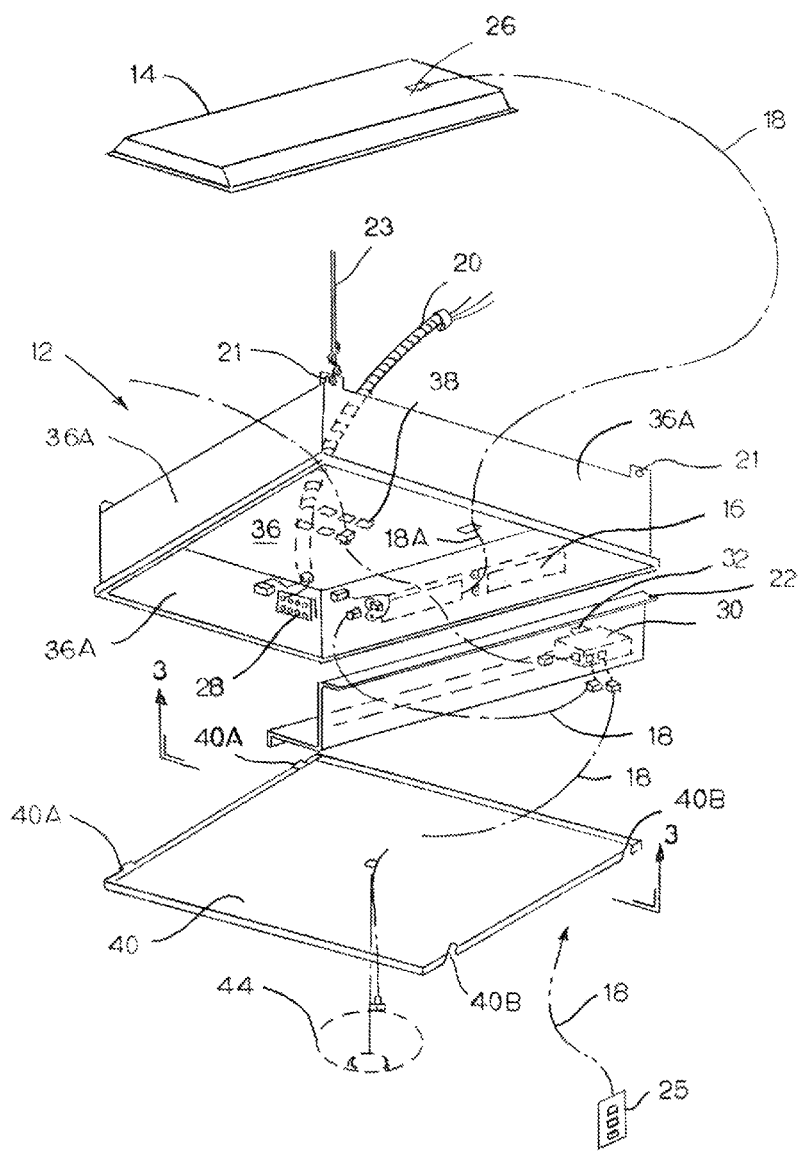
FIG. 2 is a partially exploded perspective schematic of one of the control boxes and one of the low voltage light fixtures of FIG. 1.
Figure 3:
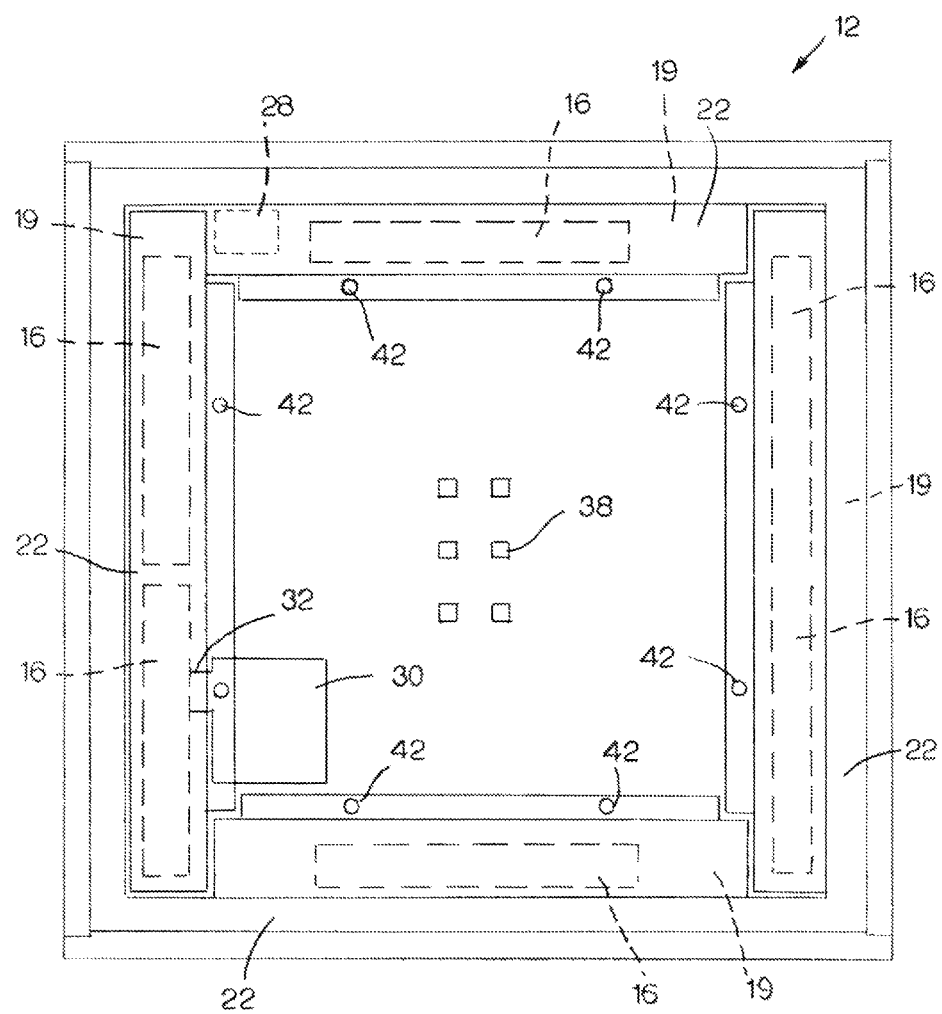
FIG. 3 is a view along line 3-3 of the fully assembled control box of FIG. 2.
Figure 4:
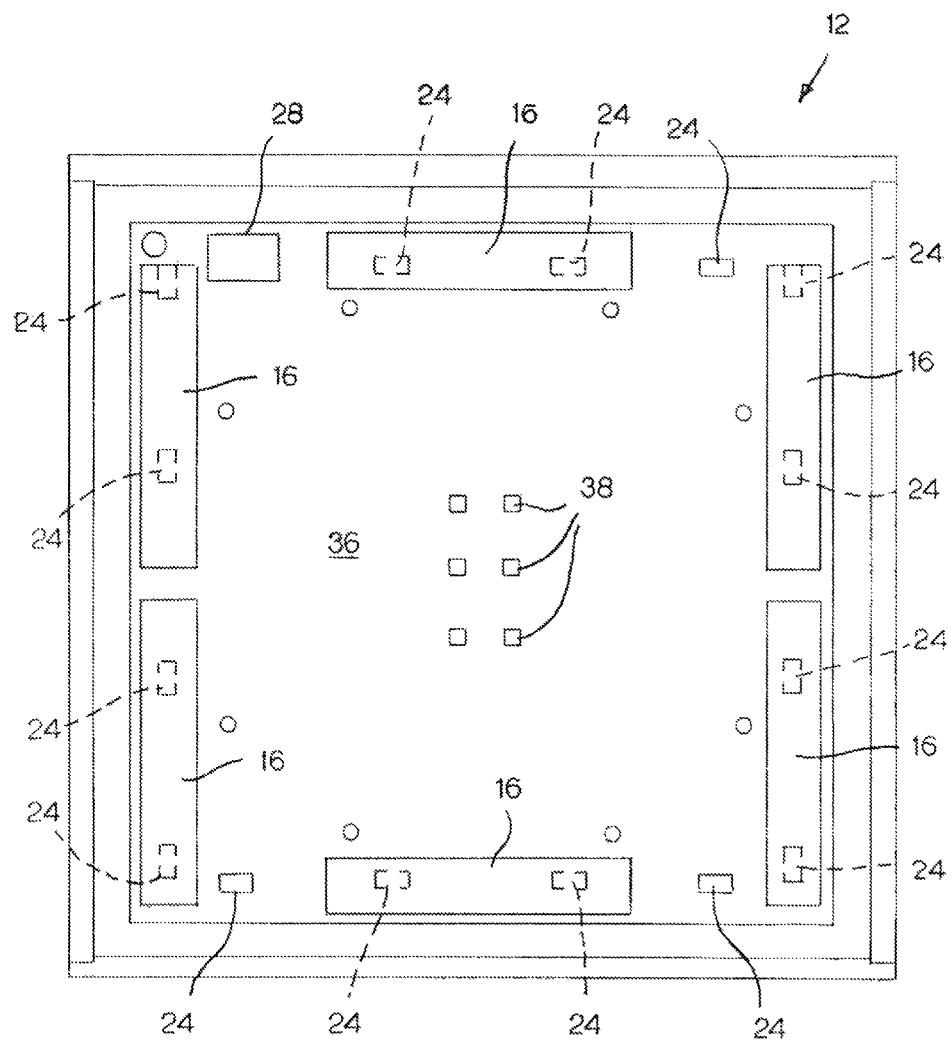
FIG. 4 is the same view as FIG. 3 but with the line voltage channel covers and the controller omitted for clarity.

FIGS. 1-4 are schematic views of a lighting system 10 made in accordance with the present invention. The lighting system 10 includes a plurality of control boxes 12, with each control box 12 mounted in a room and connected to a plurality of remotely mounted light fixtures 14 in that room. In this particular embodiment, the light fixtures 14 are low voltage, LED light fixtures without power supplies. Instead of having a power supply located at each light fixture 14, the power supplies 16 for the light fixtures 14 in a room are mounted within the control box 12 for that room, as shown in FIGS. 2-4.

Referring back to FIG. 1, the building 11 may be a commercial office building, a school, or even a hospital, for instance. The building has a plurality of rooms 13 (labeled Room 101, 102, 103, etc.), and each room has a control box 12. A computer 17 may be hooked up to a master controller 15 in order to program the master controller 15 to communicate with the control boxes 12 to control the lighting system 10. The master controller 15 is daisy-chain connected to the control boxes 12 through low voltage cables 18. The light fixtures 14 are also connected to their respective control box 12 through low voltage cables 18.

Each control box 12 is a PTP rated (Point-to-Point) electrical box enclosure which, in this embodiment, is 2' wide×2' long×4.75" tall so as to fit within one 2'×2' square in the suspension grid of a dropped ceiling. The control box 12 transmits less than 10.5 milliamps of leakage current when high-potential tested with 600 volts for 60 seconds of operation. The control box 12 has side walls 36A, a top wall 36, and a hinged door 40, which forms a bottom wall. The top four corners of the control box 12 include upwardly projecting, external tabs 21 defining openings which permit the control box 12 to be suspended by cables 23 from the structure above the dropped ceiling. The control box 12 is designed to replace one of the tiles in the dropped ceiling.

Inside the control box 12 and extending along its entire periphery is a line voltage wiring channel 19 (See FIG. 3). This channel 19 is formed and defined by four substantially "L" shaped channel covers 22 (only one of which is shown in FIG. 2), cooperating with the top 36 and side walls 36A, as best appreciated in FIGS. 2-4. Line voltage (110V or greater) exists in the control box 12 only within the confines of this line voltage wiring channel 19. Fewer or more covers 22 may be used to define the line voltage wiring channel 19, as desired. In this embodiment, the covers 22 are mounted to the top 36 of the box 12 by fasteners 42.

The low voltage power supplies 16 are mounted inside the line voltage wiring channel 19 in the factory. Each line voltage wiring channel 19 is capable of supplying power to twelve LED lighting fixtures. Also in the factory, these low voltage power supplies 16 are connected to an electrical bus 28 via quick-connect stab-in connectors. The bus 28 will receive line voltage when the box 12 is installed in the field. The low voltage power supplies 16 have low voltage output plug-in connectors, designed to receive a plug from a low voltage cable.

In order to provide an external connection to each low voltage output on the low voltage power supplies, a plurality of short, low voltage cables 18A with connectors at both ends, are installed at the factory. Each of the short cables 18A is plugged into a low voltage output of a low voltage power supply 16 and projects out of the line voltage wiring channel 19 of the control box 12 through one of the openings 24 in the top wall 36 of the control box 12 located above the low voltage power supplies 16. The control box 12 is manufactured with these short connectors 18A projecting out of the box, so an installer can make all the connections from the low voltage light fixtures 14 to the control box 12 without having to access the line voltage channel 19.

A plurality of longer, low voltage cables 18 with plugs at both ends are used to connect from each low voltage, LED light fixture 14 to one of the short cables 18A, plugging into a female receptacle 26 in the light fixture 14 at one end and into one of the short cables 18A at the other end, in order to connect each LED light fixture to the low voltage output of one of the low voltage power supplies 16 housed within the line voltage wiring channel 19.

In the field, an electrician removes the cover 22 covering the pre-wired bus 28, brings a single line voltage cable 20 (See FIG. 2) to the inside of the line voltage wiring channel 19, and connects the line side power to the electrical bus 28 inside the channel 19 via a three-wire, insulated 600 volt conductor (positive, neutral, and ground). The electrician then reinstalls the channel cover 22 over the area of the bus 28, to finish enclosing the entire line voltage channel 19, leaving a low voltage area 34 in the central area of the control box 12, with the outer perimeter of the low voltage area 34 isolated from the line voltage wiring channel 19 by the channel covers 22.

A controller 30, which in this embodiment is a low voltage control dimming switching transformer relay (See FIGS. 2 and 3), is mounted in the factory on the low voltage side of the channel cover 22 which covers the bus 28.

The controller 30 has a small appendage 32 that projects through an opening in the channel cover 22 and into the line voltage wiring channel 19, where it is connected to the bus 28 for receiving line voltage power and for communicating with the low voltage power supplies 16. The controller 30 has a plurality of female plug-in connections located in the low voltage area 34 of the control box 12, which receive male CAT 6 connectors on the CAT 6 low voltage cabling 18.

To summarize, all line voltage components and line voltage electrical connections reside within the confines of the line voltage wiring channel 19 found along the periphery of the control box 12. The line voltage wiring channel 19 is defined by the side walls 36A and top wall or ceiling 36 of the control box 12 and by the "L" shaped channel covers 22. The covers 22 isolate the low voltage area 34 in the central area of the control box 12 from the line voltage wiring channel 19. The low voltage controller 30 resides within the confines of the low voltage area 34 (See FIG. 3).

Since the connections from the low voltage power supplies 16 to their respective low voltage, LED light fixtures 14 are low voltage cables 18, 18A (See FIG. 2), there is no need to install conduit to each light fixture 14. Instead, a simple low voltage power cable 18, 18A (such as a CAT 6 cable) extends from the low voltage side of each power supply 16 to its respective light fixture 14, and the installer can make the plug-in connections on the cable 18 without entering the line voltage wiring channel 19. This substantially reduces the cost of installing the lighting arrangement by reducing the cost of materials and labor.

The low voltage power supply 16 will supply, and the low voltage power cable 18, 18A will carry, a low voltage current, from 12 volts to 58 volts, to the low voltage light fixture 14, depending upon the requirements of the light fixture 14.

As shown in FIGS. 3 and 4, the top wall 36 of the control box 12 has several openings 38 for allowing access of low voltage lines into the low voltage area 34 of the control box 12. So, for example, the daisy chain control lines 18 shown in FIG. 1, which extend from the central controller 15, to one control box 12, and then from that control box 12 to another control box 12 enter the low voltage area 34 of their respective control box through one of the openings 38. Other low voltage lines, such as a low voltage line carrying a low voltage signal from a remote motion sensor or a remote, wall-mounted light switch 25 or remote light sensor, may enter the low voltage area 34 through one of the openings 38, and then plug into one of the low voltage receptacles in the controller 30.

FIG. 2 shows that the control box 12 has a hinged door 40 which forms the bottom wall of the control box 12. The door 40 has hinges 40A on one side edge and cam latches 40B on the opposite side edge, which are received by the side walls of the control box 12 to allow the door 40 to swing open and closed and to be secured in the closed position. The door 40 may be swung open from below by an installer or repair person to give access to the controller 30 and to the power supplies 16 for all the light fixtures 14 in the room 13. It also gives access to any other controls that may be mounted in the box 12. This facilitates installation, troubleshooting, and repair of the lighting system. It should be noted that the channel covers 22 impede access to the power supplies 16 (and indeed impede access to the line voltage side of the box 12) until and unless the channel covers 22 are first removed (the channel covers 22 may be removed by removing the fasteners 42 securing the channel covers 22 to the box 12).

FIG. 2 shows that the door 40 has a knock-out opening, which is used to mount a motion detector and/or photo sensor 44 on the room side of the door 40. The motion detector/photo sensor 44 has a receptacle which receives a plug end of a low voltage cable 18, the other end of which plugs into the controller 30. This low voltage cable 18 is long enough to permit the door 40 to swing open while both ends of the cable 18 are plugged in. The motion detector/photo sensor 44 tells the controller 30 when a person is in the room by detecting motion in the room and tells the controller 30 the level of light in the room so the control system can control the level of light provided by the light fixtures 14 depending upon whether the room is occupied and depending upon the level of natural light in the room.

The control box 12 and light fixtures 14 are intended to be installed in the ceiling of a classroom or commercial building. They may be recessed in a lay-in, drop ceiling, flush mounted on a drywall ceiling, or mounted in other known ways. The control box 12 could be mounted in the wall or elsewhere instead of the ceiling, if other locations are more convenient, but it is contemplated that the ceiling will be the most convenient location in most cases.

It will be obvious to those skilled in the art that modifications may be made to the embodiment described above without departing from the scope of the invention as claimed. For instance, other types of low voltage cabling may be used and various types of sensors and control arrangements may be used. While this embodiment shows the use of low voltage LED lights, other types of low voltage lights could be used. The control box may be mounted in various orientations, so that the bottom becomes the front, and so forth.

What is claimed is:

1. A lighting arrangement, comprising, an electrical control box having side walls, a top wall, and a door forming a bottom wall, said control box including at least one channel cover which cooperates with at least one of the side walls and with the top wall of said box to define a line voltage wiring channel and an isolated low voltage area inside said control box;
   at least one low voltage power supply mounted in the line voltage wiring channel; and
   a controller mounted in the low voltage area and communicating with said low voltage power supply through the channel cover, said controller defining at least one plug-in connector for plugging in a low voltage cable;
   wherein said door has an interior side and an exterior side and further comprising a sensor mounted on the exterior side of said door, said sensor communicating with said controller by a low voltage cable plugged into said controller.

2. A lighting arrangement as recited in claim 1, wherein said door is hinged to at least one of said side walls and further comprising at least one cam latch which secures said door in a closed position; such that said electrical control box can be mounted in a ceiling of a room and can hinge down into the room for ease of access to said controller.

3. A lighting arrangement as recited in claim 1, wherein said sensor is selected from the group consisting of photo sensor and motion detector.

4. A lighting arrangement as recited in claim 1, and further comprising a low voltage light fixture mounted remotely from said electrical control box and connected to said low voltage power supply by a plug-in, low voltage cable.

5. A lighting arrangement, comprising, an electrical control box having side walls, a top wall, and a door forming a bottom wall, said control box including at least one channel cover which cooperates with at least one of the side walls and with the top wall of said box to define a line voltage wiring channel and an isolated low voltage area inside said control box;
   a plurality of low voltage power supplies mounted in the line voltage wiring channel;
   a controller mounted in the low voltage area and communicating with at least one of said low voltage power supplies through the channel cover, said controller defining at least one plug-in connector for plugging in a low voltage cable;
   and a plurality of low voltage light fixtures mounted remotely from said electrical control box, with said low voltage light fixtures connected to respective low voltage power supplies by plug-in, low voltage cables.

6. A lighting arrangement as recited in claim 5, wherein said door has an interior side and an exterior side and further comprising a sensor mounted on the exterior side of said door, said sensor communicating with said controller by a low voltage cable plugged into said controller.

7. A lighting arrangement as recited in claim 6, wherein said controller also receives a plug-in low voltage cable extending through an opening in said top wall.

8. A lighting arrangement as recited in claim 5, wherein the electrical control box transmits less than 10.5 milliamps of leakage current when high-potential tested with 600 volts for 60 seconds of operation.

9. A lighting arrangement as recited in claim 5, wherein each of said plug-in low voltage cables that connect said low voltage power supplies to said low voltage light fixtures has a first connector plugged into one of said low voltage power supplies and a second connector plugged into one of said low voltage light fixtures.

10. A lighting arrangement as recited in claim 9, wherein said low voltage light fixtures are LED light fixtures.

11. A lighting arrangement as recited in claim 10, wherein said door has an interior side and an exterior side and further comprising a sensor mounted on the exterior side of said door, said sensor communicating with said controller by a low voltage cable plugged into said controller.

\* \* \* \* \*